Nov. 12, 1940.    H. W. UTTERBACK    2,221,278
TRAILER HITCH
Filed Oct. 11, 1939    2 Sheets-Sheet 1
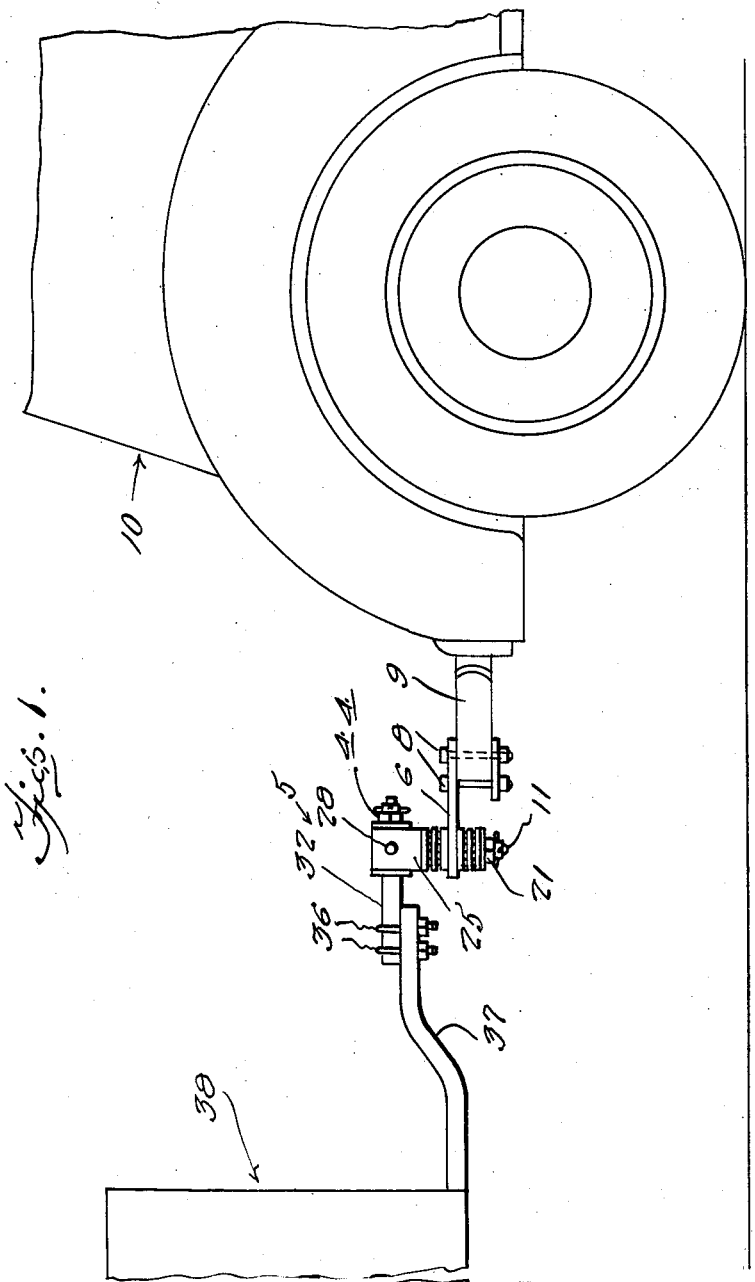
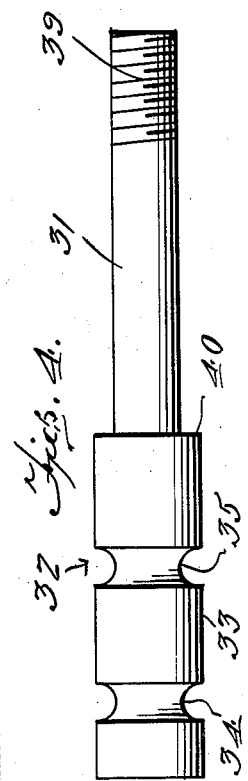
Inventor
H. W. Utterback
By Clarence A. O'Brien
and Hyman Berman.
Attorneys

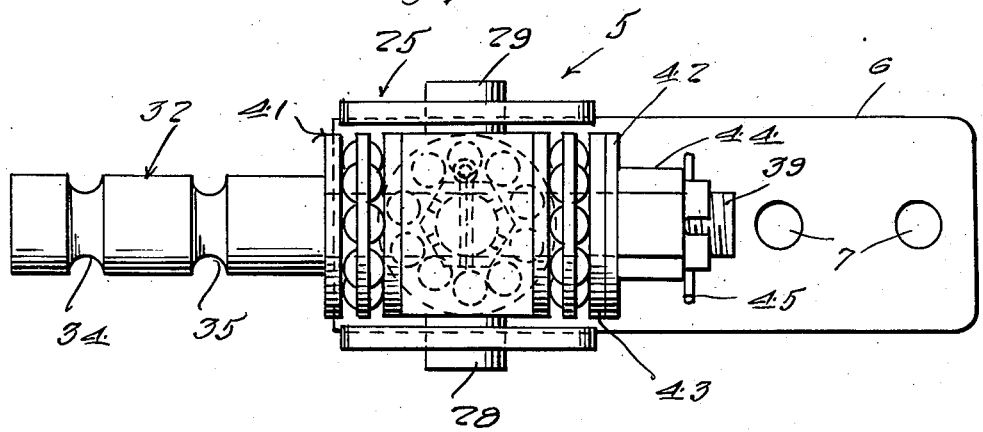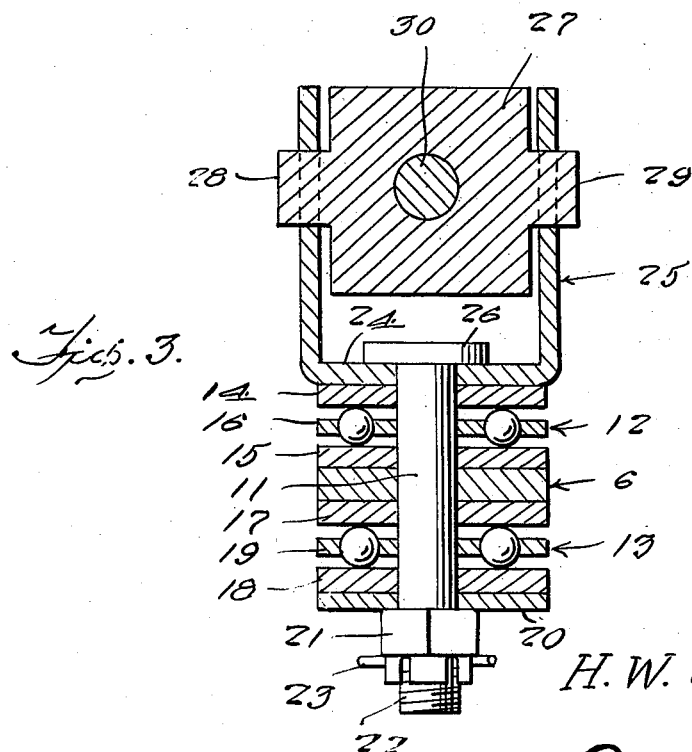

Patented Nov. 12, 1940

2,221,278

UNITED STATES PATENT OFFICE 2,221,278

TRAILER HITCH

Hugh Willis Utterback, Hiawatha, Utah

Application October 11, 1939, Serial No. 299,012

4 Claims. (Cl. 280—33.44)

My invention relates to improvements in trailer hitches, and the primary object of my invention is to provide an arrangement of this character which is free of any binding effect and which once connected cannot come loose under ordinary conditions.

Other important objects and advantages of my invention will be apparent from a reading of the following description taken in connection with the drawings, wherein for purposes of illustration I have shown a preferred embodiment of my invention.

In the drawings:

Figure 1 is a general fragmentary side elevational view showing a portion of an automobile or tractor vehicle connected with the trailer hitch of the present invention to a trailer.

Figure 2 is an enlarged top plan view of the hitch showing the same removed from the tractor vehicle and the trailer.

Figure 3 is a transverse vertical sectional view taken through Figure 2.

Figure 4 is a side elevational view of the trailer anchor element.

Referring in detail to the drawings, the numeral 5 generally designates the trailer hitch of the present invention which comprises the tractor vehicle attaching bar 6 which is flat and generally rectangular and elongated and is provided with bolt holes 7 longitudinally spaced adjacent the front end thereof to receive the bolts 8 attaching the member 6 to the bumper 9 or other structure on the tractor vehicle 10. The bar 6 has its rear end traversed by a vertical stub axle 11 on which are circumposed upper and lower ball bearing structures 12 and 13, respectively. The upper bearing 12 comprises the upper and lower plates 14 and 15 and the ball retainer 16 therebetween, while the lower bearing 13 comprises the upper and lower plates 17 and 18 with the ball retainer 19 therebetween. The lower plate 15 of the upper bearing and the upper plate 17 of the lower bearing engage the top and bottom respectively of the bar 6 as shown in Figure 3. A washer 20 is circumposed on the stub shaft or axle 11 below the member 18 of the lower bearing 13 and a nut 21 which is threaded on the threads 22 on the lower end of the axle 11 directly engages the washer 20. A cotter pin or the like retainer 23 holds the nut 21 from turning from the position in which it is adjusted.

The upper plate 14 of the upper bearing 12 engages the bight portion 24 of the U-shaped bracket 25 and this bight portion is also traversed by the upper end of the stub axle 11, the latter having a flat head 26 on its upper end which bears upon the top of the bight portion 24 in opposition to the nut 21.

A generally rectangular block 27 has trunnions 28 and 29 journaled in the arms of the U-shaped bracket 25 and this block is axially traversed by the reduced portion 31 of the trailer anchor which is generally designated 32.

The trailer anchor 32 comprises a relatively large cylindrical portion 33 which is provided at longitudinal intervals with rounded grooves 34 and 35 which provide seats for U-bolts 36 which are secured to the trailer tongue 37 which extends from the front of the trailer which is generally designated 38. The reduced portion 31 extends from the front end of the larger portion 33, passes freely through the block 27 and has the front end thereof threaded as indicated by the numeral 39.

Between the shoulder 40, defined by the front end of the portion 33 of the trailer anchor, and the rear end of the block 27 is a rear ball bearing 41, and between the front end of the block 27 and a washer 42 is disposed another similar ball bearing 43, both bearings, the block 27 and the anchor 32 being assembled in adjusted relation by the nut 44 which is threaded on the front end of the anchor and is locked in position by a cotter key or the like 45.

All of the bearings 12, 13, 41 and 43 may be of the same general type, and although ball bearings are illustrated, it is obvious that roller bearings may be employed instead, or even plain bronze or similar bearing, without substantially departing from the invention.

It is obvious that the trailer anchor 32 is free to turn relative to the tractor vehicle anchor with respect to the horizontal, and that the variations in longitudinal alignment of the vehicles, which occur in the travel of the vehicles are freely compensated for by the free action of the mechanism of which the vertical stub axle 11 forms the axis, and the trunnions 28 and 29, the transverse horizontal axis.

Although I have shown and described herein a preferred embodiment of my invention, it is to be understood that I do not desire to limit the application of the invention thereto except as may be required by the scope of the subjoined claims.

Having described the invention, what is claimed as new is:

1. A trailer hitch comprising a tractor vehicle anchor and a trailer anchor, said tractor vehicle anchor comprising a horizontal element, a vertical shaft traversing said horizontal arm and extending above and below said horizontal arm, an adjustable stop on the lower end of said shaft, anti-friction bearings circumposed on said shaft between said stop and the bottom of said horizontal arm and on the top of said horizontal arm, a head on the upper end of said shaft, a trunnion housing having a part forming an opening receiving said shaft and resting on the upper anti-friction bearing with said head bearing down on the top of said part of the trunnion housing, a trunnion block having transversely aligned trunnions turning on a horizontal axis in accommodating openings formed in said trunnion housing, said trunnion block being formed with a longitudinal bore; said trailer anchor comprising a horizontal rod having an adjustable stop on its front end and a shoulder spaced from its said front end, said rod having its front end portion passing through and beyond the bore of said trunnion block, and anti-friction bearings circumposed on said rod between said shoulder and the adjacent end of the trunnion block and between the front end of the trunnion block and the adjustable stop on the front end of the stop.

2. A trailer hitch comprising a first draft member for connection with a tractor vehicle, a vertical rotary shaft, means mounting said rotary shaft on said draft member, said means permitting rotation but precluding longitudinal movement of said shaft relative to said draft member, a second draft member for connection with the drawn vehicle, said second draft member comprising a horizontal shaft, means preventing both rotation and longitudinal movement of said horizontal shaft relative to said second draft member, a block having a bore rotatably receiving said horizontal shaft, means preventing substantial longitudinal movement of said horizontal shaft relative to said block, and means pivotally securing said block to said vertical rotary shaft for movement of said block in a vertical plane on a horizontal axis relative to said vertical shaft.

3. A trailer hitch comprising a first draft member for rigid connection to a tractor vehicle, a vertical rotary shaft, means securing said vertical rotary shaft to said first draft member and permitting only rotary movement of said vertical rotary shaft relative to said first draft member, a second draft member for rigid connection to the drawn vehicle, said second draft member comprising a horizontal stationary shaft, a body formed with a bore rotatably receiving said horizontal stationary shaft, means securing said block on said horizontal shaft, said means permitting rotation but preventing longitudinal movement of said block relative to said horizontal shaft, a yoke fixed on said vertical rotary shaft, and horizontal pivot means connecting said body between the arms of said yoke.

4. A trailer hitch comprising a first draft member for rigid connection to a tractor vehicle, said first draft member comprising a horizontal plate formed with a vertical opening, a vertical rotary shaft extending through said opening and above and below said plate, upper and lower stops on said vertical shaft, respective anti-friction bearings confined on said vertical shaft between the respective stops and the top and bottom surfaces, respectively, of said plate, a second draft member for rigid connection to the drawn vehicle, said second draft member comprising a stationary horizontal shaft having a pair of longitudinally spaced stops, a body formed with a bore rotatably receiving a portion of said horizontal shaft between said pair of stops, respective anti-friction bearings confined on said horizontal shaft between the ends of said body and the respective stops, a yoke mounted on said vertical rotary shaft, said yoke comprising laterally spaced arms located on opposite sides of said body, and horizontal pivot means connecting the arms of said yoke with said body.

HUGH WILLIS UTTERBACK.